US012565061B2

(12) United States Patent
Hannig et al.

(10) Patent No.: US 12,565,061 B2
(45) Date of Patent: Mar. 3, 2026

(54) DECORATIVE FILM

(71) Applicant: AKZENTA PANEELE + PROFILE GMBH, Kaisersesch (DE)

(72) Inventors: Hans-Jürgen Hannig, Bergisch Gladbach (DE); Felix Hüllenkremer, Koblenz (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 18/716,992

(22) PCT Filed: Dec. 23, 2022

(86) PCT No.: PCT/EP2022/087760
§ 371 (c)(1),
(2) Date: Jun. 6, 2024

(87) PCT Pub. No.: WO2023/118578
PCT Pub. Date: Jun. 29, 2023

(65) Prior Publication Data
US 2025/0042195 A1 Feb. 6, 2025

(30) Foreign Application Priority Data
Dec. 23, 2021 (EP) .................................... 21217464

(51) Int. Cl.
| | |
|---|---|
| *B44C 5/04* | (2006.01) |
| *B32B 3/30* | (2006.01) |
| *B32B 27/08* | (2006.01) |
| *B32B 38/00* | (2006.01) |
| *B32B 38/06* | (2006.01) |
| *B44F 9/02* | (2006.01) |
| *B44F 9/04* | (2006.01) |

(52) U.S. Cl.
CPC .................. *B44C 5/04* (2013.01); *B32B 3/30* (2013.01); *B32B 27/08* (2013.01); *B32B 38/06* (2013.01); *B32B 38/145* (2013.01); *B32B 2307/584* (2013.01); *B32B 2451/00* (2013.01); *B32B 2607/00* (2013.01); *B44F 9/02* (2013.01); *B44F 9/04* (2013.01)

(58) Field of Classification Search
None
See application file for complete search history.

(56) References Cited

U.S. PATENT DOCUMENTS

| | | | | |
|---|---|---|---|---|
| 4,092,198 A * | 5/1978 | Scher | ...................... | B32B 38/06 |
| | | | | 428/172 |
| 7,160,605 B2 * | 1/2007 | Fusco | .................... | B32B 27/08 |
| | | | | 428/40.1 |
| 2002/0136862 A1 * | 9/2002 | Dong | ...................... | B32B 21/08 |
| | | | | 428/479.6 |
| 2004/0146695 A1 * | 7/2004 | Hardwick | ............... | B32B 27/30 |
| | | | | 428/157 |
| 2006/0130421 A1 * | 6/2006 | Nollet | ........................ | B44F 9/02 |
| | | | | 52/582.1 |
| 2006/0188757 A1 * | 8/2006 | Magnusson | ............... | B44C 1/22 |
| | | | | 264/293 |
| 2018/0363304 A1 | 12/2018 | Hannig | | |

FOREIGN PATENT DOCUMENTS

| | | |
|---|---|---|
| CN | 101549615 B | 12/2013 |
| KR | 20090104710 A | 10/2009 |
| WO | 2012009514 A1 | 1/2012 |
| WO | 2017097705 A1 | 6/2017 |

OTHER PUBLICATIONS

International Search Report (English and German) and Written Opinion of the ISA (German) issued in PCT/EP2022/087760, mailed Feb. 21, 2023; ISA/EP.
Nov. 28, 2025. Office Action issued in corresponding Chinese Application No. 202280085429.8.

* cited by examiner

*Primary Examiner* — Laura C Powers
(74) *Attorney, Agent, or Firm* — Harness, Dickey & Pierce, P.L.C.

(57) ABSTRACT

The present disclosure relates to a decorative film, in particular for a decorated wall panel or floor panel, characterised in that the decorative film has a printing substrate film with a first side and a second side opposite the first side, and a wear protection film contacting the first side of the printing substrate film, wherein a decoration is applied at least partially on the first and/or second side of the printing substrate film. The disclosure further relates to a method for producing the decorative film, means for implementing the method, a method for producing a decorative panel comprising the decorative film, and a decorative panel produced according to the method.

16 Claims, 3 Drawing Sheets

DECORATIVE FILM

CROSS-REFERENCE TO RELATED APPLICATIONS

Figure 1:
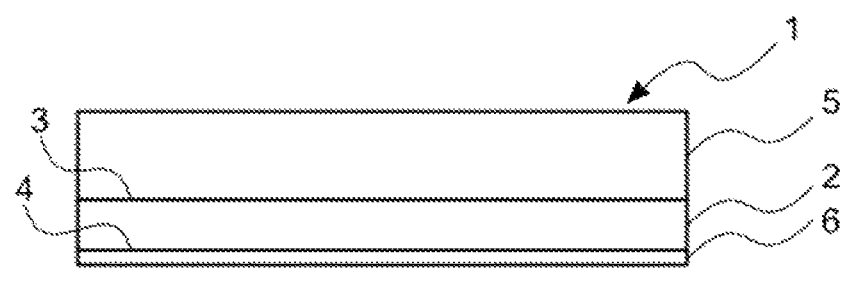

This application is a U.S. National Phase application under 35 U.S.C. 371 of International Application No. PCT/EP2022/087760, filed on Dec. 23, 2022, which claims the benefit of European Patent Application No. 21217464.3, filed on Dec. 23, 2021. The entire disclosure of the aforementioned European Patent Application is incorporated herein by reference.

FIELD

The present disclosure relates to a decor film, in particular for a decorated wall or floor panel, wherein the decor film comprises a print substrate film with a first side and a second side opposite the first side, and a wear protection film contacting the first side of the print substrate film, wherein a decor is at least partially applied to the second side of the print substrate film.

A further subject of the present disclosure is a method for producing a decor film according to the disclosure, a device for performing the method, a method for producing a decor panel comprising the decor film according to the disclosure, as well as a decor panel produced using the method according to the disclosure.

BACKGROUND

This section provides background information related to the present disclosure which is not necessarily prior art.

The term "decor panel" within the meaning of the disclosure refers to wall, ceiling, door, or floor panels, which comprise a decor applied onto a carrier plate. Decor panels are used in a variety of ways both for the interior finishing of rooms and the decorative cladding of buildings, for example in the construction of exhibition stands. One of the most common areas of application of decor panels is their use as floor covering or for cladding ceilings, walls, or doors.

Examples of such imitated natural materials are types of wood such as maple, oak, birch, cherry, ash, walnut, chestnut, wenge or exotic woods like panga panga, mahogany, bamboo, and bubinga. In addition, natural materials such as stone surfaces or ceramic surfaces are often imitated. To protect the applied decor layer, wear or top layers are usually applied on top of the decor layer.

Decor panels are often produced as laminates, in which, for example, a decor paper preprinted with a desired decor is applied to a carrier plate onto which a so-called overlay is then applied. After optionally applying a counteracting paper to the side of the carrier plate opposite the decor paper the obtained layer arrangement is firmly bonded together using suitable pressure- and/or heat-activated adhesives.

Decor films are also known per se and may be laminated onto carrier plates, for example, to obtain decor panels. A problem of known decor films can be that, on one hand, the film should offer sufficient wear protection and, on the other hand, must be able to be printed on and should also be easy to connect to a carrier. Especially in the field of decor films expected to meet all these required properties, there is still potential for further development.

SUMMARY

This section provides a general summary of the disclosure, and is not a comprehensive disclosure of its full scope or all of its features.

A task of the present disclosure is to provide an improved decor film, which is particularly suitable for decorated wall or floor panels.

The disclosure thus proposes a decor film, in particular for a decorated wall or floor panel, wherein the decor film comprises a print substrate film with a first side and a second side opposite the first side, and a wear protection film contacting the first side of the print substrate film, wherein a decor is at least partially applied to the second side and/or to the first side of the print substrate film.

Surprisingly, it was found that such a decor film is particularly easy to produce and also has a particularly good processability. In addition, such a decor film has particularly good wear properties while consuming comparatively few raw materials. Without being bound to any theory, it is in particular assumed that the decor film exhibits these advantageous properties due to the decor being applied to the second side of the print substrate film and the wear protection film contacting the first side of the print substrate film. The comparatively low raw material consumption together with particularly good wear properties may, in particular, result from the fact that both the print substrate film and the wear protection film protect the print during the subsequent application of the decor film. In the case of a decor film comprising the decor on the first side of the print substrate film, a thinner and correspondingly more resource-saving wear protection film may be selected because the print substrate film also acts as a wear protection. At the same time, the good processability may result from the fact that the print substrate film is allowed to be thin, so that, for the application of the decor, in particular printers may be used to apply the decor that only allow for a small mass of the printed sheets in order to still be able to compensate for sheet tension fluctuations and at the same time enable high printing speeds. Furthermore, the decor film may be particularly easy to process because it can be applied directly onto a corresponding carrier. Surprisingly, it was found that the decor film may be easily applied to a corresponding carrier, even though the side with which the film is applied is provided with the decor layer. Without being bound to any theory, it is in particular assumed that the print substrate film physically crosslinks with the carrier through the print layer during the application. Thus, the aforementioned advantages may be achieved, wherein, in particular surprisingly, no particular disadvantages could be found in regard to the application of the decor film.

In particular, it has been shown that special visual effects may be achieved with a decor that is at least partially applied on the first side and at least partially on the second side of the print substrate film. For example, a special depth of field of the decor may be achieved by a partial decor being applied on the first side of the print substrate film and a complementary partial decor being applied on the second side of the print substrate film. In this manner, for example, visual effects that depend on the viewing angle may be created, which may be advantageously utilized in the representation of natural structures, such as wood grain or, in particular, knot holes.

Within the meaning of the disclosure, the term "decor film" is in particular understood to refer to a film that is able to be applied to panels or other materials, comprises a visually perceptible decor, and protects against wear. Insofar as the decor film is a part of, for example, a decor panel, the term decor film may also be understood to refer to a decor layer.

Within the meaning of the disclosure, the term "print substrate film" is in particular understood to refer to a film on which a decor is able to be printed. Insofar as the print substrate film is a part of the decor film, the term print substrate film may also be understood to refer to a print substrate layer.

Within the meaning of the disclosure, the term "wear protection film" is in particular understood to refer to a film that protects against wear, in particular against the wearing of the surface of the decor film. Insofar as the wear protection film is a part of the decor film, the term wear protection film may also be understood to refer to a wear protection layer.

The decor film described above thus has, in particular, improved and raw material-saving producibility and also good processability, as well as good wear properties.

It may be preferred that the print substrate film and/or the wear protection film are substantially transparent. This may advantageously achieve that the decor applied to the second side of the print substrate film is visible through the print substrate film or the wear protection film, respectively.

It may be preferred that the print substrate film and the wear protection film each comprise a first polymer, wherein the first polymer preferably comprises a vinyl polymer, more preferably a propylene-based vinyl polymer, most preferably a polypropylene copolymer.

Polymers of this type in particular offer the advantage that products made from them are easy to recycle. This may also result in a reduction in production costs, for example.

Within the meaning of the present disclosure, the term "vinyl polymer" is understood to refer to polymers from monomers in which at least some of the monomers comprise a vinyl group. A vinyl group within the meaning of the present application may also be referred to as an ethenyl group. Within the meaning of the present disclosure, the term "vinyl polymer" is understood to refer to a halide-free vinyl polymer.

It may be preferred that the first polymer is a polypropylene copolymer with random distribution.

It may be preferred that the print substrate film includes at least one B-layer, wherein the B-layer preferably comprises the first polymer.

In other words, it may thus be provided that the print substrate film includes a layer that comprises the first polymer. This may, in particular, achieve that the properties of the print substrate film can be adjusted by the choice of the first polymer.

It may be preferred that the B-layer comprises the first polymer in an amount in a range of greater than or equal to 50 wt. % to less than or equal to 100 wt. % based on the total weight of the B-layer, preferably greater than or equal to 60 wt. %, more preferably greater than or equal to 70 wt. %, more preferably greater than or equal to 80 wt. %, more preferably greater than or equal to 90 wt. %, even more preferably greater than or equal to 95 wt. %, most preferably greater than or equal to 99 wt. % to less than or equal to 100 wt. %.

It may be preferred that the print substrate film includes at least one layer selected from the group consisting of an A-layer and a C-layer, wherein the A-layer comprises a second polymer and the C-layer comprises a third polymer.

In other words, it may be provided that the print substrate film includes a layer comprising the second polymer, includes a layer comprising the third polymer, or includes a layer comprising the second polymer and a layer comprising the third polymer. This may achieve that the properties of the print substrate film can be adjusted particularly flexibly. In particular, this may achieve that the properties of the first and second sides of the print substrate film are adjustable.

It may be preferred that the A-layer comprises the second polymer in an amount in a range of greater than or equal to 50 wt. % to less than or equal to 100 wt. % based on the total weight of the A-layer, preferably greater than or equal to 60 wt. %, more preferably greater than or equal to 70 wt. %, more preferably greater than or equal to 80 wt. %, more preferably greater than or equal to 90 wt. %, even more preferably greater than or equal to 95 wt. %, most preferably greater than or equal to 99 wt. % to less than or equal to 100 wt. %.

It may be preferred that the C-layer comprises the third polymer in an amount in a range of greater than or equal to 50 wt. % to less than or equal to 100 wt. % based on the total weight of the C-layer, preferably greater than or equal to 60 wt. %, more preferably greater than or equal to 70 wt. %, more preferably greater than or equal to 80 wt. %, more preferably greater than or equal to 90 wt. %, even more preferably greater than or equal to 95 wt. %, most preferably greater than or equal to 99 wt. % to less than or equal to 100 wt. %.

It may be preferred that the second polymer comprises a vinyl polymer, preferably a vinyl copolymer, more preferably a vinyl copolymer selected from the group consisting of a propylene-based vinyl copolymer, a vinyl terpolymer, and mixtures thereof, most preferably selected from the group consisting of a propylene-ethylene random copolymer, a polypropylene-ethylene-butylene copolymer, an ethylene propylene diene monomer rubber, and mixtures thereof.

This may ensure that the print is particularly well applied to the print substrate film, and/or the wear protection film is particularly well connected to the print substrate film.

Surprisingly, it has further been shown that a lower tacticity or an atacticity of the second polymer supports a particularly good connection of the printing ink to the print substrate film.

It may be preferred that the second polymer is a thermoplastic vinyl polymer.

It may be preferred that the propylene-ethylene random copolymer has an ethylene content in a range of greater than or equal to 1 wt. % to less than or equal to 10 wt. % based on the propylene-ethylene random copolymer, preferably greater than or equal to 2 wt. % to less than or equal to 6 wt. %, for example 4 wt. %.

It may be preferred that the propylene-ethylene random copolymer has a Vicat softening temperature (A50), measured according to ISO 306, in a range of greater than or equal to 90° C. to less than or equal to 120° C., preferably greater than or equal to 100° C. to less than or equal to 110° C.

It may be preferred that the polypropylene-ethylene-butylene copolymer has a melting point, measured according to ISO 11357-3, in a range of greater than or equal to 110° C. to less than or equal to 150° C., preferably greater than or equal to 120° C. to less than or equal to 130° C.

It may be preferred that the polypropylene-ethylene-butylene copolymer has a Vicat softening temperature (A50), measured according to ISO 306, in a range of greater than or equal to 80° C. to less than or equal to 110° C., preferably greater than or equal to 90° C. to less than or equal to 100° C.

It may be preferred that the melt flow rates MFR (230° C., 2.16 kg) of the first polymer and the second polymer, measured according to EN ISO 1133-1, differ from each other by less than or equal to 3 g/10 min, preferably less than or equal to 2 g/10 min, most preferably less than or equal to 1 g/10 min.

It may be preferred that the third polymer comprises an adhesion promoter, preferably an adhesion promoter selected from the group consisting of a maleic anhydride grafted polymer, an ethylene-based copolymer, and mixtures thereof, more preferably selected from the group consisting of a maleic anhydride grafted polypropylene, a maleic anhydride grafted polyethylene, an ethyl-acrylic acid copolymer, an ethyl methacrylate, an ethyl butyl acrylate, an ethyl vinyl acetate, and mixtures thereof.

It may be preferred that the maleic anhydride grafted polypropylene has a Vicat softening temperature (A50), measured according to ISO 306, in a range of greater than or equal to 100° C. to less than or equal to 140° C., preferably greater than or equal to 115° C. to less than or equal to 125° C.

It may be preferred that the maleic anhydride grafted polypropylene has a melting point, measured according to ISO 11357-3, in a range of greater than or equal to 130° C. to less than or equal to 160° C., preferably greater than or equal to 140° C. to less than or equal to 150° C.

It may be preferred that the maleic anhydride grafted polyethylene has a Vicat softening temperature (A50), measured according to ISO 306, in a range of greater than or equal to 50° C. to less than or equal to 120° C., for example greater than or equal to 60° C. to less than or equal to 70° C. or greater than or equal to 80° C. to less than or equal to 85° C.

It may be preferred that the maleic anhydride grafted polyethylene has a melting point, measured according to ISO 11357-3, in a range of greater than or equal to 100° C. to less than or equal to 130° C., preferably greater than or equal to 110° C. to less than or equal to 120° C.

It may be preferred that the ethyl-acrylic acid copolymer has an acrylic acid content in a range of greater than or equal to 1 wt. % to less than or equal to 10 wt. % based on the total weight of the ethyl-acrylic acid copolymer, preferably greater than or equal to 5 wt. % to less than or equal to 7 wt. %.

It may be preferred that the ethyl-acrylic acid copolymer has a melting point, measured according to ISO 11357-3, in a range of greater than or equal to 85° C. to less than or equal to 115° C., preferably greater than or equal to 95° C. to less than or equal to 105° C.

It may be preferred that the ethyl methacrylate has a methyl acrylate content in a range of greater than or equal to 10 wt. % to less than or equal to 30 wt. % based on the total weight of the ethyl methacrylate, preferably greater than or equal to 20 wt. % to less than or equal to 25 wt. %.

It may be preferred that the ethyl methacrylate has a melting point, measured according to ISO 11357-3, in a range of greater than or equal to 65° C. to less than or equal to 95° C., preferably greater than or equal to 75° C. to less than or equal to 85° C.

It may be preferred that the ethyl butyl acrylate has a melting point, measured according to ISO 11357-3, in a range of greater than or equal to 80° C. to less than or equal to 110° C., preferably greater than or equal to 90° C. to less than or equal to 100° C.

It may be preferred that the ethyl butyl acrylate has a Vicat softening temperature (A50), measured according to ISO 306, in a range of greater than or equal to 45° C. to less than or equal to 75° C., preferably greater than or equal to 55° C. to less than or equal to 65° C.

It may be preferred that the ethyl vinyl acetate has a vinyl acetate content in a range of greater than or equal to 5 wt. % to less than or equal to 25 wt. % based on the total weight of the ethyl vinyl acetate, preferably greater than or equal to 10 wt. % to less than or equal to 15 wt. %.

It may be preferred that the ethyl vinyl acetate has a melting point, measured according to ISO 11357-3, in a range of greater than or equal to 75° C. to less than or equal to 105° C., preferably greater than or equal to 85° C. to less than or equal to 95° C.

It may be preferred that the ethyl vinyl acetate has a Vicat softening temperature (A50), measured according to ISO 306, in a range of greater than or equal to 45° C. to less than or equal to 75° C., preferably greater than or equal to 55° C. to less than or equal to 65° C.

This may ensure that the print is particularly well applied to the print substrate film, and/or the wear protection film is particularly well connected to the print substrate film.

It may be preferred that the A-layer comprises a mixture of the second polymer and the first polymer. This may, in particular, improve the adhesion between different layers of the print substrate film.

It may be preferred that the C-layer comprises a mixture of the third polymer and the first polymer. This may, in particular, improve the adhesion between different layers of the print substrate film.

It may be preferred that the print substrate film includes a plurality of layers, wherein the layers are selected from A-layers, B-layers, and C-layers. This may achieve that the properties of the print substrate film can be adjusted particularly well.

It may be preferred that the print substrate film includes more than one, in particular more than two, for example three layers.

It may be preferred that the print substrate film includes a plurality of layers, wherein preferably at least one of the layers is a B-layer. This may achieve that the print substrate film is, for example, particularly tear-resistant and easy to process.

It may be preferred that the print substrate film includes a plurality of layers and the plurality of layers has a layer sequence between the first side of the print substrate film and the second side of the print substrate film selected from the layer sequences A-B, B-A, B-B-B, A-B-C, A-B-A, A-B-B, A-B-C-B-A, A-B-C-B-B, and A-B-C-B-C, wherein the layer sequence is preferably selected from the layer sequences B-B-B, A-B-C, A-B-A, and A-B-B.

This is understood to mean that the layers of the print substrate film, starting from the first side of the print substrate film, include A-, B-, or C-layers in the specified order. Most preferably, the print substrate film consists of the layers in the specified order. In other words, for example, this means that the print substrate film, in a layer sequence of A-B-C, starting from the first side of the print substrate film, includes an A-layer, followed by a B-layer, which in turn is followed by a C-layer, wherein in particular the C-layer then forms the second side of the print substrate film onto which the decor is applied.

In a preferred embodiment, it may be provided that the print substrate film includes fewer than four, preferably fewer than three, for example exactly one or exactly two layers. In a preferred embodiment, it may be provided that the print substrate film consists of a B-layer. In an alternative, preferred embodiment, it may be provided that the print substrate film consists of two layers, wherein the two layers have a layer sequence between the first side of the print substrate film and the second side of the print substrate film of A-B or B-A, in particular A-B.

This may achieve that the production of the decor film is particularly simple.

It may be preferred that the decor at least partially applied to the second side of the print substrate film includes a decor replicating a decor template.

The decor may, for example, imitate a natural material. Examples of such imitated natural materials or decor templates include types of wood such as maple, oak, birch, cherry, ash, walnut, chestnut, wenge, or exotic woods like panga panga, mahogany, bamboo, and bubinga. In addition, natural materials such as stone surfaces or ceramic surfaces are often imitated.

Accordingly, within the meaning of the present disclosure, a "decor template" can in particular be understood to refer to such an original natural material or at least a surface thereof, which is to be imitated or replicated by the decor.

The decor may preferably have a thickness in a range of ≥5 µm to ≤10 µm.

It may be preferred that the print substrate film on the second side includes an A-layer, a C-layer, and/or a B-layer.

In the case that the second side of the print substrate film is an A-layer or a C-layer, the decor may advantageously be applied directly to the second side of the print substrate film.

In the case that the second side of the print substrate film is a B-layer, it may be provided that a primer layer is arranged between the second side of the print substrate film and the applied decor. This may advantageously achieve that the decor adheres particularly well to the print substrate film. For example, it may be provided that the primer layer comprises a polyurethane-based primer.

It may be preferred that the print substrate film has a thickness of greater than or equal to 5 µm to less than or equal to 500 µm, preferably greater than or equal to 20 µm to less than or equal to 400 µm, more preferably greater than or equal to 50 µm to less than or equal to 300 µm, most preferably greater than or equal to 100 µm to less than or equal to 200 µm.

This may achieve that the decor film can be produced particularly easily. In particular, this may achieve that the application of the decor to the print substrate film is easy to implement technically.

It may be preferred that the print substrate film is a biaxially stretched polypropylene film, in particular one with a thickness in a range of greater than or equal to 5 µm to less than or equal to 80 µm, a uniaxially stretched polypropylene film, in particular one with a thickness in a range of greater than or equal to 50 µm to less than or equal to 150 µm, or an unstretched polypropylene film, in particular one with a thickness in a range of greater than or equal to 50 µm to less than or equal to 300 µm. It has been shown that these films are particularly suitable as print substrate films and can be processed particularly well, and are also easy to recycle.

It may be preferred that the wear protection film includes at least one B-layer, wherein the B-layer preferably comprises the first polymer. This may achieve that the properties of the wear protection film can also be adjusted by the choice of the first polymer. For the other features of the B-layer and the first polymer, reference is made to the description of the print substrate film. In a preferred embodiment, the B-layer of the print substrate film and the B-layer of the wear protection film may be chosen to be the same.

It may be preferred that the wear protection film includes at least one layer selected from the group consisting of an A-layer and a C-layer, wherein the A-layer comprises the second polymer and the C-layer comprises the third polymer. For the other features of the A- and C-layers and of the second and third polymers, reference is made to the description of the print substrate film. In a preferred embodiment, the A-layer of the print substrate film and the A-layer of the wear protection film may be chosen to be the same, and/or the C-layer of the print substrate film and the C-layer of the wear protection film may be chosen to be the same.

In other words, it may be provided that the wear protection film includes a layer comprising the second polymer, includes a layer comprising the third polymer, or includes a layer comprising the second polymer and a layer comprising the third polymer. This may achieve that the properties of the wear protection film can be adjusted particularly flexibly. In particular, this may achieve that the properties of the surface of the decor film and the side of the wear protection film that contacts the print substrate film are adjustable.

It may be preferred that the wear protection film includes a plurality of layers, wherein the layers are selected from A-layers, B-layers, and C-layers, in particular from A-layers and B-layers.

In a preferred embodiment, it may be provided that the wear protection film includes more than one, in particular more than two, for example three layers.

In a preferred embodiment, it may be provided that the wear protection film includes a plurality of layers, wherein preferably at least one of the layers is a B-layer.

It may be preferred that the wear protection film includes a plurality of layers and the plurality of layers has a layer sequence from one side of the wear protection film to the opposite side of the wear protection film that contacts the print substrate film, which is selected from the layer sequences A-B, B-A, A-B-A, A-B-C, B-B-A, A-B-B, and C-B-A, in particular B-B-A.

This is understood to mean that the layers of the wear protection film, starting from the first side of the wear protection film, include A-, B-, or C-layers in the specified order. Most preferably, the wear protection film consists of the layers in the specified order. In other words, for example, this means that the wear protection film, in a layer sequence of A-B-C, starting from one side of the wear protection film, includes an A-layer, followed by a B-layer, which in turn is followed by a C-layer, wherein in particular the C-layer then contacts the first side of the print substrate film.

In a preferred embodiment, it may be provided that the wear protection film includes fewer than four, preferably fewer than three, for example exactly one or exactly two layers. In a preferred embodiment, it may be provided that the wear protection film includes only one layer, preferably a B-layer. In a preferred embodiment, it may be provided that the wear protection film consists of a B-layer. In an alternative, preferred embodiment, it may be provided that the wear protection film consists of two layers, wherein the two layers have a layer sequence from one side of the wear protection film to the opposite side of the wear protection film contacting the print substrate film of A-B or B-A, in particular B-A.

This may achieve that the production of the decor film is particularly simple.

Preferably, it may be provided that the wear protection film has a patterned surface structure, for example an all-over structure or a structure that is configured at least partially synchronous with the decor. This may allow creation of a surface that appears to be of particularly high quality using the decor film.

It may be preferred that the print substrate film and the wear protection film combined have a thickness in a range greater than or equal to 50 µm to less than or equal to 1000 µm, preferably greater than or equal to 100 µm to less than or equal to 750 µm, preferably greater than or equal to 200 µm to less than or equal to 600 µm, more preferably greater than or equal to 300 µm to less than or equal to 500 µm.

This may achieve that the decor film as a whole meets the requirements for wear protection films particularly well.

Preferably, it may be provided that the print substrate film and the wear protection film combined include fewer than six, preferably fewer than five, more preferably fewer than four, for example two or three layers. In a preferred embodiment, it may be provided that the print substrate film consists of a B-layer and the wear protection film consists of two layers, wherein the two layers have a layer sequence from one side of the wear protection film to the opposite side of the wear protection film contacting the print substrate film of B-A. In an alternative, preferred embodiment, it may be provided that the print substrate film consists of two layers, wherein the two layers have a layer sequence between the first side of the print substrate film and the second side of the print substrate film of A-B and the wear protection film consists of a B-layer.

It could be shown that this combination can be produced particularly easily and at the same time offers particularly good wear protection and good presentation of the decor.

It may be preferred that the decor film additionally includes a lacquer-containing top layer contacting the wear protection film, wherein the lacquer-containing top layer preferably comprises a top-coat lacquer selected from the group consisting of melamine resin and acrylate-based plastic compounds, in particular polyurethane-modified acrylate plastic compounds.

This may advantageously achieve that the wear protection properties are further improved.

Furthermore, according to the disclosure, a method for producing a decor film as described above includes the method steps:

a) providing a print substrate film having a first side and a second side opposite the first side;
 b) applying a decor to the first and/or second side of the print substrate film;
 c) providing a wear protection film;
 d) connecting the wear protection film with the first side of the print substrate film;
 e) optionally embossing the wear protection film; and
 f) optionally coating the wear protection film with a lacquer.

The method may advantageously be particularly easy to perform, and the obtained decor film may have a particularly good processability. In particular, based on the method described above, the print substrate film is allowed to be thin, so that, for the application of the decor, in particular printers may be used to apply the decor that only allow for a small mass of the printed sheets in order to still be able to compensate for sheet tension fluctuations and at the same time enable high printing speeds. At the same time, the wear protection film may also be particularly thin because the print substrate film contributes to the wear protection of the decor.

In detail, the first method step a) includes providing a print substrate film having a first side and a second side opposite the first side. With regard to the other preferred features of the print substrate film, reference is made to the description of the decor film. In one embodiment, the print substrate film may, in particular, be provided as rolled goods and be unwound for the method.

In the subsequent method step b), a decor is then applied to the first and/or second side of the print substrate film. From a process engineering point of view, the second side may, in particular, be the lower side of the decor film. Since the decor is later viewed through the print substrate film and the wear protection film, the decor is preferably applied using reverse printing. This means, in particular, that the print reproduces the decor or the decor template in mirror image and the resulting decor is viewed through the print substratum, i.e. through the print substrate film and the wear protection film.

In one embodiment of the disclosure, it may be provided that, in method step b), a decor is applied to the first and second sides of the print substrate film, in particular that complementary partial decors are applied to the first and second sides of the print substrate film. Here, it may be provided that the application of the decors to the first and second sides of the print substrate film is simultaneous, preferably by means of two separate printing devices, or it may be sequential. In the case of sequential application of the decor, it may be provided that this is also performed by means of two separate printing devices, which are preferably arranged sequentially to each other. Here, in particular, it may be provided that the print substrate film is flipped between a first and a second printing device so that in both printing devices the respective decor application is preferably performed in the direction of gravity. Alternatively, it may be provided that a decor application is performed by means of only one printing device, and a decor film, after receiving a print onto a first side thereof, is re-fed to the printing device for decor application to the second side.

In the case of sequential decor application to the first and second sides of the print substrate film, it may be provided that, together with the application of a first decor to a first side, so-called register marks are applied, which are used to synchronize the application of the decor on a second side with the decor already applied to the first side. Here, in particular, it may be provided that the register marks form a part of the applied decor.

Furthermore, the decor may be applied by so-called direct printing. Within the meaning of the disclosure, the term "direct printing" refers to the application of a decor directly onto the print substrate film. Different printing techniques, such as flexography, offset printing, or screen printing may also be utilized. In particular, digital printing techniques such as inkjet or laser printing methods may be used. Each of these printing methods may, in particular, be performed using the reverse printing method.

It may be preferred that the application of the decor includes the use of thermally sealable printing inks. Within the meaning of the present disclosure, thermally sealable printing inks are, in particular, also understood to refer to inks suitable for laminating. For example, it may be provided that the inks suitable for laminating comprise a radiation-curable ink preferably in an amount based on the ink suitable for laminating of $\geq 50$ wt. % to $\leq 99$ wt. %, preferably $\geq 70$ wt. % to $\leq 95$ wt. %, more preferably from $\geq 80$ wt. % to $\leq 90$ wt. %, and a thermally activatable matrix material preferably in an amount based on the ink suitable for laminating of $\geq 1$ wt. % to $\leq 50$ wt. %, preferably $\geq 5$ wt. % to $\leq 30$ wt. %, more preferably from $\geq 10$ wt. % to $\leq 20$ wt. %, wherein the matrix material comprises at least one thermally activatable polymer, preferably in an amount based on the ink suitable for laminating of $\geq 1$ wt. % to $\leq 30$ wt. %, preferably $\geq 5$ wt. % to $\leq 20$ wt. %, more preferably from $\geq 10$ wt. % to $\leq 15$ wt. %.

This may, in particular, achieve that a concealing adhesive or a concealing layer can be omitted.

In a preferred embodiment, it may be provided that the second side of the print substrate film is an A-layer or a C-layer, wherein the application of the decor to the second side of the print substrate film includes a direct application to the second side or A- or C-layer.

This may make the method particularly easy to perform, as no further treatment of the print substrate film is necessary.

In an alternative embodiment, it may be provided that the second side of the print substrate film is a B-layer, wherein the application of the decor on the second side of the print substrate film includes as a first step the application of a primer. This may achieve that the print also adheres well to the B-layer.

In the subsequent method step c), a wear protection film is provided. With regard to the other preferred features of the wear protection film, reference is made to the description of the decor film.

In one embodiment, the wear protection film may be provided as rolled goods and be unwound for the process according to the method. In an alternative embodiment, the wear protection film for the process may be produced in-line, for example with an extruder and a wide slot nozzle.

In the subsequent method step d), the wear protection film is connected with the first side of the print substrate film.

This connection process may preferably be performed under the influence of pressure and/or temperature, for example with a calender or a press. In particular in the case that the wear protection film for the method is produced in-line, for example with an extruder and a wide slot nozzle, it may be provided that the wear protection film is directly connected with the print substrate film during cooling using a calender. It may be preferred that the connection process includes concealing, laminating, and/or sealing.

In an optional method step e), the wear protection film is then embossed, wherein a patterned surface structure of the wear protection film is created. For example, an all-over structure or a structure that is configured at least partially synchronous to the decor may be created.

Within the meaning of the present disclosure, the embossing of the wear protection film is also understood to refer to an embossing of the entire decor film, wherein the patterning is introduced via the surface of the wear protection film. Here, the patterning may also reach the print substrate film.

This may advantageously achieve that a patterning structure can be introduced particularly deep without affecting the decor. Thus, structures haptically more perceptible may be achieved. Surprisingly, it could also be shown that, with the method described above, embossing all the way through into the decor layer can be avoided, which means that no special measures are necessary to preserve the decor, which is a reason why the method is particularly easy to perform.

It may be preferred that the patterned surface structure has a maximum depth in a range of greater than or equal to 50 μm to less than or equal to 200 μm, for example greater than or equal to 100 μm to less than or equal to 150 μm.

In one embodiment, it may be provided that method step e) is performed after method step d), wherein, in particular, an embossing device is used subsequent to the connection or concealing process. This may advantageously achieve that the embossing can be introduced particularly flexibly and may, in particular, be easily changed between different structures. In an alternative embodiment, it may be provided that method step e) is performed together with method step d), wherein, in particular, a roller of the connection step or concealing step creates the embossing. This may advantageously achieve that no additional step for patterning the surface is necessary.

In an optional method step f), the process of coating the wear protection film with a lacquer is performed. This may, in particular, achieve even better wear protection and, at the same time, a surface visually and haptically appearing to be of higher quality. In one embodiment, it may be provided that step f) is performed before applying the decor film to a carrier. Alternatively, it may be provided that step f) is only performed after applying the decor film to a carrier.

In a preferred embodiment, it may be provided that method step f) is performed after method step e). This may cause the method to be particularly easy to perform.

In an alternative, preferred embodiment, it may be provided that method step f) is performed before method step e). This may achieve a particularly precise surface patterning. It may be preferred that the lacquer on the wear protection film is cured, in particular at least partially cured, before method step e). This enables a particularly precise introduction of the structure. For example, in a preferred embodiment, it may be provided that, in method step f), a lacquer is applied and initially partially cured, for example thermally, and then, in method step e), the wear protection film is embossed, wherein the lacquer is fully cured subsequently, for example using UV radiation. Here, the lacquer may preferably comprise an acrylate-based lacquer, in particular a polyurethane acrylate lacquer.

Subsequently, the decor film may undergo a cooling process, wherein different variants may be used. The cooling process may, for example, be performed by a calender roll system (smoothing system). A cooling roller may also be used. Here, an air knife and a vacuum chamber may ensure uniform abutting of the melt to the cooling roller. Such a procedure is known, for example, from the production of cast films.

Also according to the disclosure is a device for performing the aforementioned method, wherein the device comprises means for performing said method. For the advantages of the device according to the disclosure, explicit reference is made to the advantages of the method according to the disclosure.

Also according to the disclosure is a method for producing a decor panel, which includes the method steps:

a) providing a previously described decor film;
    b) providing a carrier;
    c) applying the decor film to the carrier; and
    d) connecting the decor film with the carrier to form the decor panel.

The carrier may be a sheet-like carrier or a plate-like carrier.

A "sheet-like carrier" may be understood to refer to a carrier that, during its production process, has a sheet- or ribbon-like and thus significantly greater length compared to its thickness or width, and whose length may be greater than 15 meters, for example.

Within the meaning of the present disclosure, a "plate-like carrier" may also be understood to refer to a carrier that has been formed by separating a piece from the sheet-like carrier and is plate-shaped. Furthermore, the plate-like carrier may already specify the shape and/or size of the panel to be produced. However, the plate-like carrier may also be provided as a large plate. A large plate within the meaning of the disclosure is, in particular, a carrier whose dimensions exceed the dimensions of the final decor panels by a multiple and which is divided into a corresponding plurality of decor panels in the course of the production process, for example by sawing or by laser or water jet cutting. For example, the large plate may correspond to the sheet-like carrier.

In detail, method step a) is provided first, wherein a previously described decor film is provided. The decor film according to the disclosure may be provided as rolled goods or produced in-line upstream of the method. With regard to the other preferred features of the decor film, reference is made to the description of the decor film.

In the subsequent method step b), a carrier is provided. In principle, the carrier may be a carrier that is also commonly used in the production of decorated wall or floor panels.

It may be preferred that the carrier comprises a sealable layer on one side and the decor film is applied to the sealable layer.

In a preferred embodiment, it may be provided that the sealable layer comprises a vinyl copolymer, wherein the vinyl copolymer preferably includes a vinyl terpolymer, more preferably a polypropylene-based vinyl copolymer, most preferably a polypropylene-ethylene-butylene copolymer. This may achieve that the decor film is particularly easy to connect to the sealable layer.

Furthermore, in the preferred embodiment, it may be provided that the sealable layer comprises a vinyl-alkyl acrylate copolymer, preferably a vinyl-butyl acrylate copolymer, more preferably an ethylene butyl acrylate.

Furthermore, in the preferred embodiment, it may be provided that the sealable layer comprises a masterbatch, preferably a vinyl polymer-based masterbatch, more preferably an LDPE-based masterbatch, wherein the masterbatch preferably comprises white pigment, preferably titanium dioxide. This may advantageously achieve that the sealable layer can also be used as a decor substratum. Thus, it may be achieved that the decor of the decor film is showcased particularly well.

In the embodiment, it may be preferred that the sealable layer comprises a solid material, wherein the solid material is preferably selected from the group consisting of calcium carbonate and kaolin.

In the embodiment, it may be preferred that the sealable layer comprises the vinyl copolymer in a range of greater than or equal to 50 wt. % to less than or equal to 100 wt. %, comprises the vinyl-alkyl acrylate copolymer in a range of greater than or equal to 0 wt. % to less than or equal to 50 wt. %, comprises the masterbatch in a range of greater than or equal to 0 wt. % to less than or equal to 10 wt. %, and comprises the second solid material in a range of greater than or equal to 0 wt. % to less than or equal to 50 wt. %.

It has been demonstrated that such carriers are particularly suitable for applying the decor films according to the disclosure.

In the subsequent method step c), the decor film is applied to the carrier. Here, the decor film may, for example, be unwound onto the carrier.

Especially in the case that the carrier does not comprise a sealable layer, it may also be provided that method step c) additionally includes applying a concealing adhesive between the carrier and the decor film. For example, a concealing adhesive may be applied to the surface of the carrier or to the decor of the decor film. It may be preferred that the concealing adhesive is selected from the group consisting of hot melt adhesives and UV-curable adhesives.

In the subsequent method step d), the decor film is connected with the carrier to form the decor panel. This connection process may preferably be performed under the influence of pressure and/or temperature, for example with a calender or a press. The connection process may preferably include pressing the decor film onto the carrier.

In a preferred embodiment, it may be provided that, after method step d), the decor film is additionally provided with a lacquer-containing top layer contacting the wear protection film, wherein the lacquer-containing top layer preferably comprises a top-coat lacquer selected from the group consisting of melamine resin and acrylate-based plastic compounds, in particular polyurethane-modified acrylate plastic compounds. Preferably, this may be provided if the decor film itself has not been provided with a lacquer-containing top layer.

This may advantageously achieve that the wear protection properties are further improved.

In a further step, the carrier provided with the decor film may then be divided into individual panels by suitable mechanical methods. This may be performed, for example, by cutting at regular intervals or at regular times. Preferably, cut panels of equal length may be created by this method step. In addition, the edges of the cut panels may be profiled, in particular to create locking means.

Furthermore, according to the disclosure, a decor panel is produced using the method according to the disclosure. With regard to the other preferred features of the decor panel, reference is made to the description of the methods and the decor film. For the advantages of the decor panel according to the disclosure, explicit reference is also made to the advantages of the methods according to the disclosure and to the advantages of the decor film according to the disclosure.

DRAWINGS

The drawings described herein is for illustrative purposes only of selected embodiment(s) and not all possible implementations, and are not intended to limit the scope of the present disclosure.

The disclosure is explained in more detail below with reference to the Figures. The Figures show possible embodiments of the disclosure. However, in principle, combinations or modifications of the embodiment within the scope of the disclosure are also possible.

FIG. 1 schematically shows the layer arrangement of an embodiment of the decor film according to the disclosure.

Figure 2:
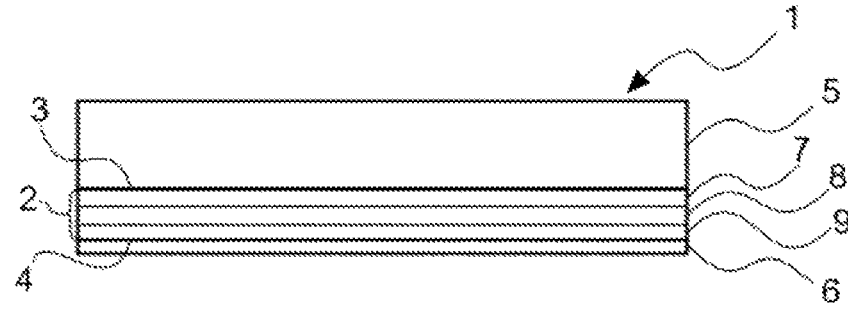

FIG. 2 schematically shows the layer arrangement of a further development of the decor film according to the disclosure.

Figure 3:
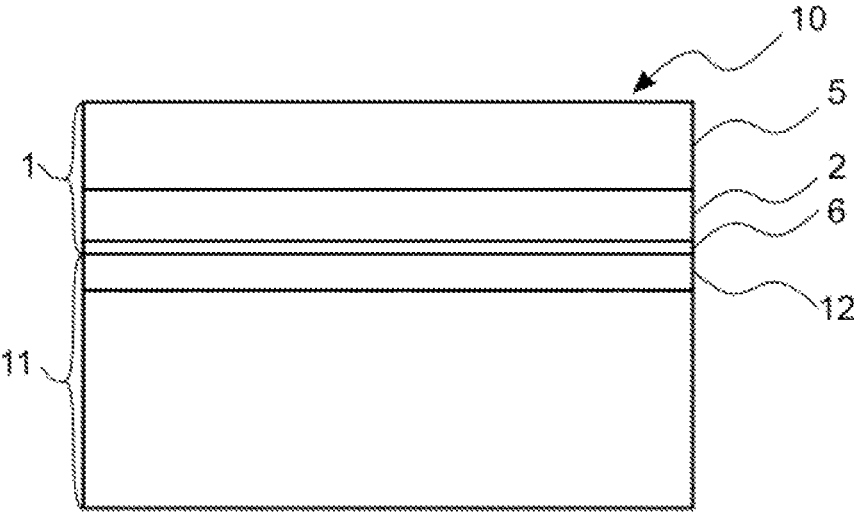

FIG. 3 schematically shows the layer arrangement of a decor panel according to the disclosure.

Figure 4:
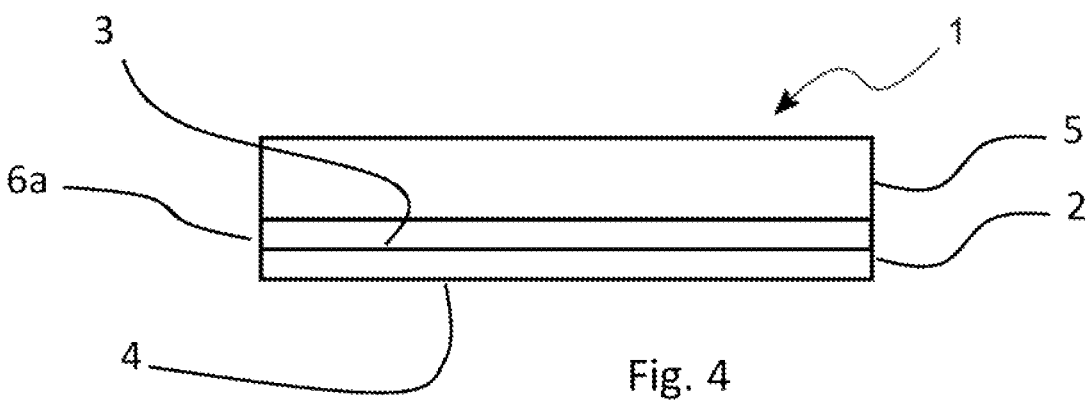

FIG. 4 schematically shows the layer arrangement of an embodiment of the decor film according to the disclosure.

Figure 5:
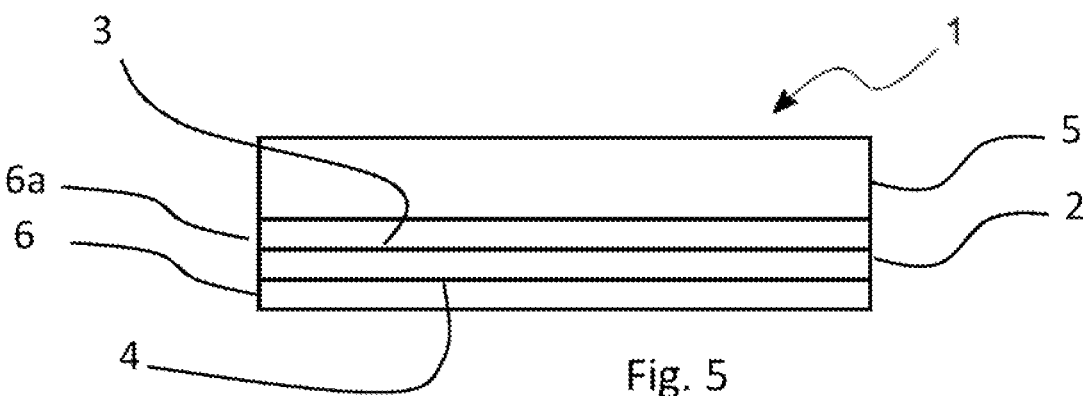

FIG. 5 schematically shows the layer arrangement of an embodiment of the decor film according to the disclosure with a double-sided decor print.

Figure 6:
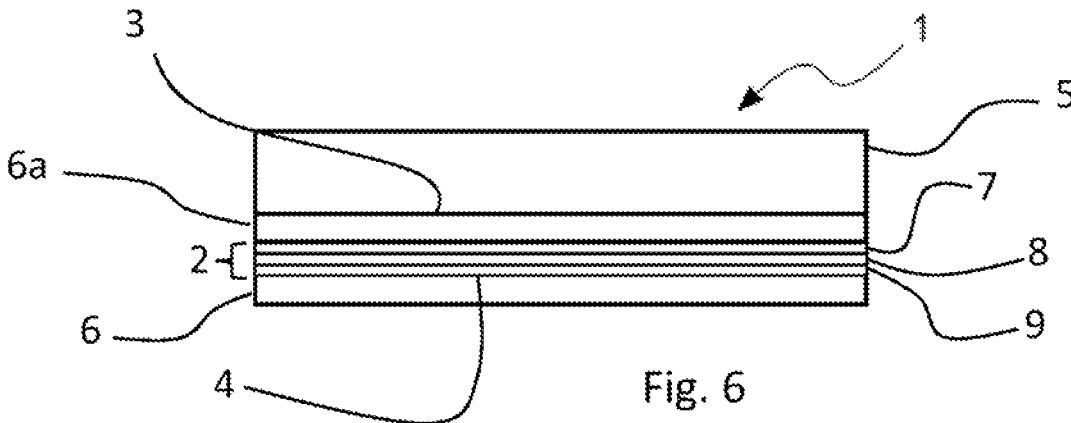

FIG. 6 schematically shows the layer arrangement of an embodiment of the decor film according to the disclosure with a double-sided decor print.

Figure 7:
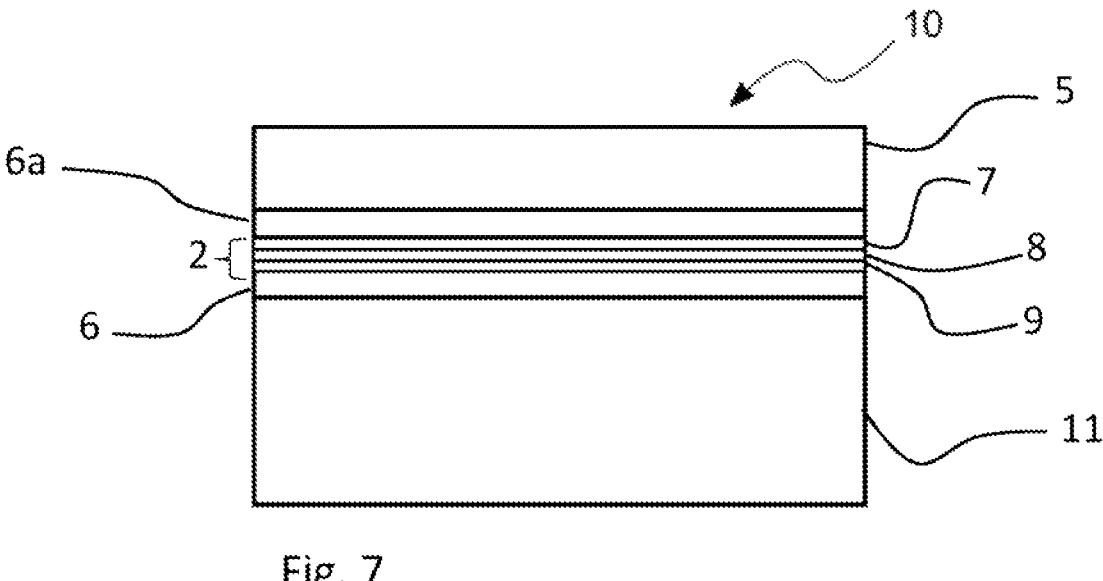

FIG. 7 schematically shows the layer arrangement of an embodiment of the decor film according to the disclosure with a double-sided decor print.

Figure 8:
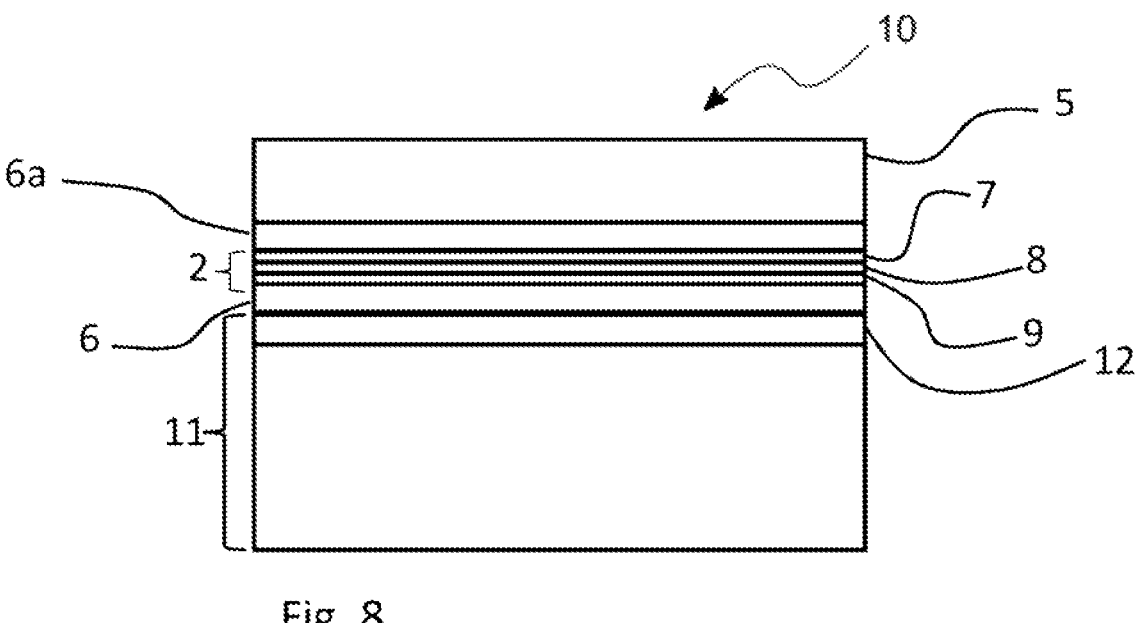

FIG. 8 schematically shows the layer arrangement of an embodiment of a decor panel according to the disclosure with a double-sided decor print.

Corresponding reference numerals indicate corresponding parts throughout the view of the drawings.

DETAILED DESCRIPTION

Example embodiment(s) will now be described more fully with reference to the accompanying drawings.

In detail, FIG. 1 schematically shows the cross-section of an embodiment of the decor film 1 according to the disclosure. The decor film 1 comprises a print substrate film 2 with a first side 3 and a second side 4 opposite the first side 3. In addition, the decor film 1 comprises a wear protection film 5, wherein the wear protection film 5 contacts the first side 3 of the print substrate film 2. In addition, a decor 6 is applied to the second side 4 of the print substrate film 2.

The decor film 1 shown was produced using the method according to the disclosure, wherein the print substrate film 2 was provided and the decor 6 was applied to the second side 4 of the print substrate film 2. In a further step, the wear protection film 5 was provided and subsequently connected with the first side 3 of the print substrate film 2.

FIG. 2 schematically shows the cross-section of a further development of the decor film 1 according to the disclosure. Here, the decor film 1 shown comprises, in particular, a print substrate film with a plurality of layers 7, 8, 9. Here, the plurality of layers has a layer sequence, which is, for example, selected between the first side 3 of the print substrate film 2 and the second side 4 of the print substrate film 2 from B-B-B, A-B-C, A-B-A, A-B-B, A-B-C-B-A, A-B-C-B-B, and A-B-C-B-C. In the layer sequence A-B-C for example, layer 7 is an A-layer, layer 8 is a B-layer, and layer 9 is a C-layer.

FIG. 3 schematically shows the cross-section of a decor panel 10 according to the disclosure produced using the method according to the disclosure, wherein the decor film 1 from FIG. 1 and a carrier 11 comprising a sealable layer 12 were provided. The decor film 1 was applied to the carrier 11 and was connected with the carrier 11 to form the decor panel 10.

FIG. 4 schematically shows the cross-section of an embodiment of the decor film 1 according to the disclosure. The decor film 1 comprises a print substrate film 2 with a first side 3 and a second side 4 opposite the first side 3. In addition, the decor film 1 comprises a wear protection film 5, wherein the wear protection film 5 is arranged on the first side 3 of the print substrate film 2. Furthermore, a decor 6a is applied to the first side 3 of the print substrate film 2.

The decor film 1 shown was produced using the method according to the disclosure, wherein the print substrate film 2 was provided and the decor 6a was applied to the first side 3 of the print substrate film 2. In a further step, the wear protection film 5 was provided and subsequently arranged on the first side 3, wherein it is connected to the decor 6a in the areas of the applied decor 6a and connected to the first side 3 of the print substrate film 2 in areas without decor 6a.

FIG. 5 schematically shows the cross-section of an embodiment of the decor film 1 according to the disclosure. The decor film 1 comprises a print substrate film 2 with a first side 3 and a second side 4 opposite the first side 3. In addition, the decor film 1 comprises a wear protection film 5, wherein the wear protection film 5 is arranged on the first side 3 of the print substrate film 2. Furthermore, a decor 6a is applied to at least a partial area of the first side 3 of the print substrate film 2, and a decor 6 is applied to at least a partial area of the second side 4 of the print substrate film.

The decor film 1 shown was produced using the method according to the disclosure, wherein the print substrate film 2 was provided and the decor 6a was applied to the first side 3 of the print substrate film 2 and the decor 6 was applied to the second side 4 thereof. Here, the application of the decors 6 and 6a may be performed in two processing steps directly or not directly following each other. In a further step, the wear protection film 5 was provided and subsequently arranged on the first side 3, wherein it is connected to the decor 6a in the areas of the applied decor 6a and connected to the first side 3 of the print substrate film 2 in areas without decor 6a.

FIG. 6 schematically shows the cross-section of a further development of the decor film 1 according to the disclosure. Here, the decor film 1 shown comprises, in particular, a print substrate film with a plurality of layers 7, 8, 9. Here, the plurality of layers has a layer sequence, which is, for example, selected between the first side 3 of the print substrate film 2 and the second side 4 of the print substrate film 2 from B-B-B, A-B-C, A-B-A, A-B-B, A-B-C-B-A, A-B-C-B-B, and A-B-C-B-C. In the layer sequence A-B-C for example, layer 7 is an A-layer, layer 8 is a B-layer, and layer 9 is a C-layer. In addition, the decor film 1 comprises a wear protection film 5, wherein the wear protection film 5 is arranged on the first side 3 of the print substrate film 2. Furthermore, a decor 6a is applied to at least a partial area of the first side 3 of the print substrate film 2, and a decor 6 is applied to at least a partial area of the second side 4 of the print substrate film.

FIG. 7 schematically shows the cross-section of a decor panel 10 according to the disclosure produced using the method according to the disclosure, wherein the decor film 1 from FIG. 6 and a carrier 11 were provided. The decor film 1 was directly applied to the carrier 11 and was connected with the carrier 11 to form the decor panel 10.

FIG. 8 schematically shows the cross-section of a decor panel 10 according to the disclosure produced using the method according to the disclosure, wherein the decor film 1 from FIG. 6 and a carrier 11 comprising a sealable layer 12 were provided. Here, the sealable layer may be an integral component of the carrier 11. In particular, the carrier 11 may be provided as a co-extrudate from a carrier 11 and a sealable layer 12 by means of a co-extrusion process. The decor film 1 was applied to the carrier 11 and was connected with the carrier 11 to form the decor panel 10.

The foregoing description of the embodiment(s) has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A decor film for a decorated wall or floor panel, wherein the decor film comprises a substantially transparent print substrate film with a first side and a second side opposite the first side, and a wear protection film arranged on the first side of the substantially transparent print substrate film, wherein a decor is at least partially applied to the second side of the substantially transparent print substrate film visible through the substantially transparent print substrate film and the decor is at least partially applied to the first side of the print substrate film, wherein the decor applied to the first and second sides are coordinated to produce a combined layered visual effect with increased depth perception when viewed through the substantially transparent print substrate film.

2. The decor film according to claim 1, wherein the substantially transparent print substrate film and the wear protection film each comprise a first polymer, wherein the first polymer comprises a vinyl polymer or a propylene-based vinyl polymer or a polypropylene copolymer.

3. The decor film according to claim 2, wherein the substantially transparent print substrate film includes a plurality of layers and wherein at least one of the layers is a B-layer, wherein said B-layer comprises the first polymer.

4. The decor film according to claim 2, wherein the substantially transparent print substrate film includes a plurality of layers and wherein at least one of the plurality of layers is selected from the group consisting of an A-layer and a C-layer, wherein the A-layer comprises a second polymer and the C-layer comprises a third polymer.

5. The decor film according to claim 4, wherein the second polymer comprises a vinyl polymer or a vinyl copolymer, wherein the vinyl copolymer is selected from the group consisting of a propylene-based vinyl copolymer, a vinyl terpolymer, and mixtures thereof, or wherein the vinyl copolymer is selected from the group consisting of a pro-pylene-ethylene random copolymer, a polypropylene-ethyl-ene-butylene copolymer, an ethylene propylene diene mono-mer rubber, and mixtures thereof.

6. The decor film according to claim 4, wherein the third polymer comprises an adhesion promoter selected from the group consisting of a maleic anhydride grafted polymer, an ethylene-based copolymer, and mixtures thereof, or wherein the adhesion promoter is selected from the group consisting of a maleic anhydride grafted polypropylene, a maleic anhydride grafted polyethylene, an ethyl-acrylic acid copo-lymer, an ethyl methacrylate, an ethyl butyl acrylate, an ethyl vinyl acetate, and mixtures thereof.

7. The decor film according to claim 3, wherein the plurality of layers has a layer sequence between the first side of the print substrate film and the second side of the print substrate film, which is selected from the layer sequences A-B, B-A, B-B-B, A-B-C, A-B-A, A-B-B, A-B-C-B-A, A-B-C-B-B, and A-B-C-B-C.

8. The decor film according to claim 1, wherein the decor which is at least partially applied to the first side and the second side of the substantially transparent print substrate film comprises a predefined printed pattern replicating a decorative design.

9. The decor film according to claim 1, wherein the wear protection film includes a plurality of layers and wherein at least one layer of the plurality of layers is a B-layer, wherein the B-layer comprises a first polymer.

10. The decor film according to claim 1, wherein the wear protection film has a surface patterning.

11. A method for producing a decor film according to claim 1, comprising:
   a) providing the substantially transparent print substrate film having a first side and a second side opposite the first side;
   b) applying a decor to the first and second side of the substantially transparent print substrate film;
   c) providing a wear protection film;
   d) connecting the wear protection film with the first side of the substantially transparent print substrate film;
   e) optionally embossing the wear protection film; and
   f) optionally coating the wear protection film with a lacquer.

12. The method according to claim 11, wherein, in step b), a decor is applied by applying a partial decor to the first side of the print substrate film and applying a partial decor to the second side of the print substrate film.

13. A method for producing a decor panel, including the method steps:
   a) providing a decor film according to claim 1;
   b) providing a carrier;
   c) applying the decor film to the carrier; and
   d) connecting the decor film with the carrier to form the decor panel.

14. The method according to claim 13, wherein the carrier preferably comprises a sealable layer on one side and the decor film is applied to the sealable layer without applying an additional adhesive layer.

15. A decor panel produced using the method according to claim 13.

16. The decor film according to claim 4, wherein the plurality of layers has a layer sequence between the first side of the print substrate film and the second side of the print substrate film, which is selected from the layer sequences A-B, B-A, B-B-B, A-B-C, A-B-A, A-B-B, A-B-C-B-A, A-B-C-B-B, and A-B-C-B-C.

* * * * *